United States Patent [19]

Johnson

[11] Patent Number: 4,899,869

[45] Date of Patent: Feb. 13, 1990

[54] CONVEYOR FOR FOOD ARTICLES

[75] Inventor: Gregg E. Johnson, Boerne, Tex.

[73] Assignee: Bakery Equipment & Service Co., Inc., San Antonio, Tex.

[21] Appl. No.: 293,051

[22] Filed: Jan. 3, 1989

[51] Int. Cl.⁴ .............................................. B65G 37/00
[52] U.S. Cl. ...................................... 98/603; 198/318; 198/861.5
[58] Field of Search ............ 198/603, 851, 853, 861.5, 198/318, 314

[56] References Cited

U.S. PATENT DOCUMENTS

| | | | |
|---|---|---|---|
| 2,250,933 | 7/1941 | Manierre | 198/318 X |
| 2,759,591 | 8/1956 | Erickson | 198/318 X |
| 2,799,384 | 7/1957 | Rutherford | 198/603 X |
| 2,878,776 | 3/1959 | Vogel | 198/603 X |
| 2,963,144 | 12/1960 | Wognum | 198/853 |
| 3,478,704 | 11/1969 | Ford | 198/603 X |

OTHER PUBLICATIONS

Exit Conveyor Assy. Mar. 4, 1987.

Primary Examiner—Robert L. Spar
Assistant Examiner—Cheryl L. Gastineau
Attorney, Agent, or Firm—Hubbard, Thurman, Turner & Tucker

[57] ABSTRACT

A multi-flight conveyor for transporting food articles is formed in its entirety from metals and plastic materials that are approved for use in food processing. Each conveyor flight frame comprises a ladder like structure wherein two stainless steel side rails are interconnected by a plurality of longitudinally spaced support rods formed of a lubricious plastic material. A stainless steel drive shaft is journalled at one end of the conveyor in sealed bearings. All of the rods and the drive shaft are then enclosed in a stainless steel wiremesh endless belt, which is supported and lubricated by the plastic support rods. All flights are substantially identical, except for length, and are detachably rigidly secured in a vertically stacked array which is angularly adjustable relative to the horizontal.

7 Claims, 2 Drawing Sheets

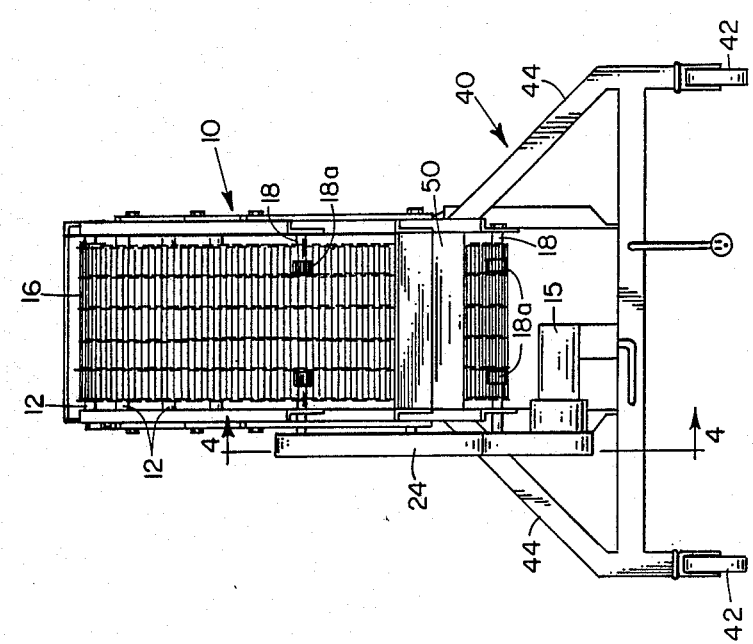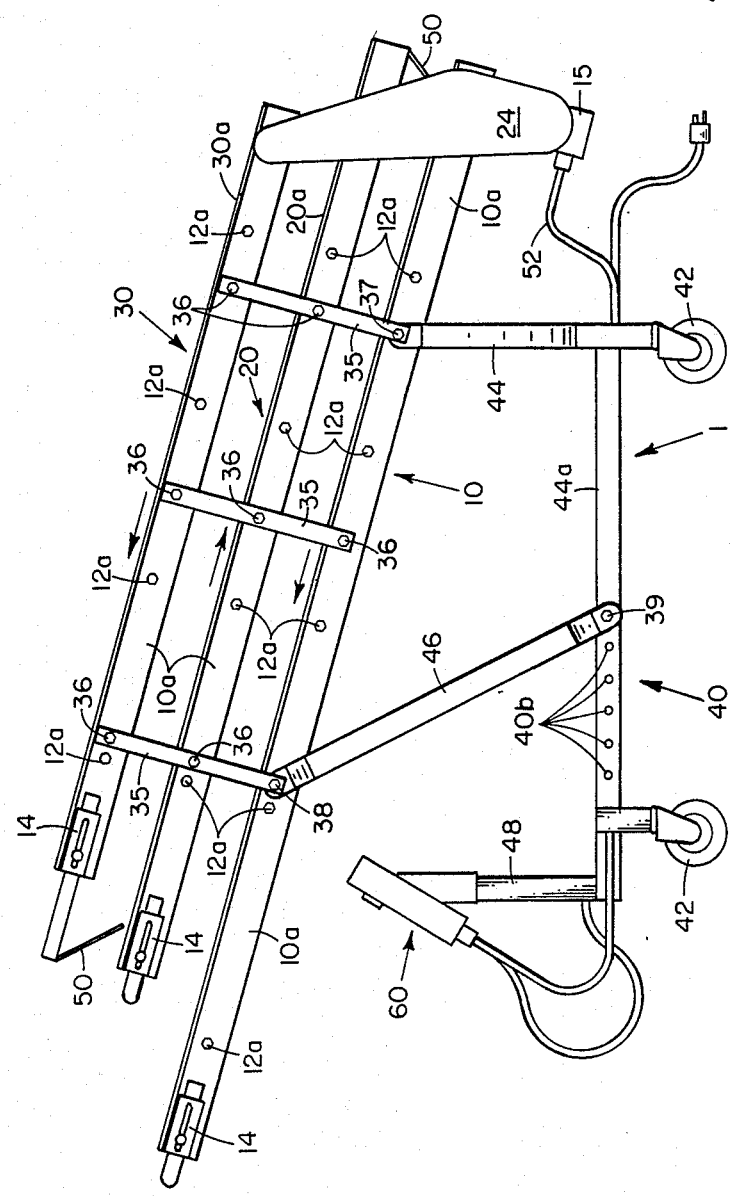

CONVEYOR FOR FOOD ARTICLES

BACKGROUND OF THE INVENTION

1. FIELD OF THE INVENTION

The invention relates to a multi-flight conveyor for use in processing food articles, and more particularly for conveying baked goods discharged from an oven through a cooling period.

2. SUMMARY OF THE PRIOR ART

The requirements of the U.S. Food and Drug Administration for food processing machinery are well known in the art. Specifically, any metals utilized must be either stainless steel or have properties similar to stainless steel so that contamination of the food articles by the metal or rust forming thereon is eliminated. Additionally, plastic materials that contact the food articles or are in close proximity to the food articles must comprise one of the class consisting of plastic materials that are approved by the U.S.F.D.A.

These requirements have resulted in food processing conveyors being quite expensive in comparison with ordinary conveyors. It is therefore desirable to reduce to the greatest extent possible the employment of stainless steel structural members in the design of the conveyor and additionally, to achieve the lubrication of the endless belt of the conveyor in a manner that does not present food contamination problems. Ready conversion of the unit from single flight to a multi-flight unit is another desirable feature missing from prior art units. The prior art has not provided a simplified design of a multi-flight endless belt conveyor employing a minimum of stainless steel components which is readily assembled or disassembled and adjustable relative to the horizontal.

SUMMARY OF THE INVENTION

The invention comprises a multi-flight conveyor wherein each flight has a ladder like frame, including a pair of laterally spaced parallel, stainless steel side rails which are interconnected by a plurality of longitudinally spaced plastic support rods. At one end of the side rails, a stainless steel drive shaft for the endless belt conveyor is mounted in sealed bearings and the drive shaft projects through one of the sealed bearings to mount a drive sprocket. Suitable driving connections are provided from a sealed motor which is secured in depending relation to said one end of one of the side rails. A floor engaging support frame is provided upon which the lowermost flight conveyor is adjustably mounted to assume a desired angular position relative to the horizontal. A wiremesh, endless belt conveyor formed of stainless steel encircles the support rods and the drive shaft and is engaged by stainless steel sprockets carried by the drive shaft. To provide lubricity for the movement of the wiremesh endless belt, each of the support rods comprises a rod or tube formed of a wear resistant, lubricious plastic material that is approved by the U.S.F.D.A. for use in the food processing industry. The wiremesh endless belt conveyor rests on the support rods and no additional lubrication is required for the endless belt of the conveyor flight.

If a particular application requires a greater length of the conveyor to accomplish the required air cooling of baked articles on the conveyor, the conveyor embodying this invention may be conveniently assembled with a plurality of substantially identical endless belt conveyors disposed in vertically stacked, generally parallel relationship. The plurality of conveyor flights are held in this position by a plurality of links respectively detachably rigidly connected to both side rails of the various conveyor flight, with each conveyor flight having its discharge end overlying the input end of the underlying conveyor flight which moves in a reverse direction.

A floor engaging support frame provides a horizontal pivotal mounting for one end of the stack of conveyors and an adjustable height mounting for the other end of the stacked conveyors. Thus, the food articles, and in particular a baked article emerging from a baking oven, may be deposited at the lower end of the uppermost conveyor and moved by that conveyor to its upper end where it is dropped to the next underlying conveyor and, if desired, inverted during the dropping movement. The baked article thus progresses through the series of vertically stacked conveyors and is discharged from the upper end of the lowermost conveyor into a collecting receptacle or onto a conveyor that leads to a packaging operation.

The primary advantage of a conveyor constructed in accordance with this invention is its utilization of a minimum number of stainless steel components and the ease of assembly and disassembly from a single flight to a multiple flight conveyor, plus convenient adjustment of the angle of the conveyor relative to the horizontal.

Further advantages of the invention will be readily apparent to those skilled in the art from the following detailed description, taken in conjunction with the annexed sheets of drawings, on which is shown a preferred embodiment of the invention.

BRIEF DESCRIPTION OF THE DRAWINGS

FIG. 1 is a side elevational view of a conveyor for food articles embodying this invention.

FIG. 2 is a side elevational view of the conveyor shown in FIG. 1.

DESCRIPTION OF PREFERRED EMBODIMENT

Figure 4:
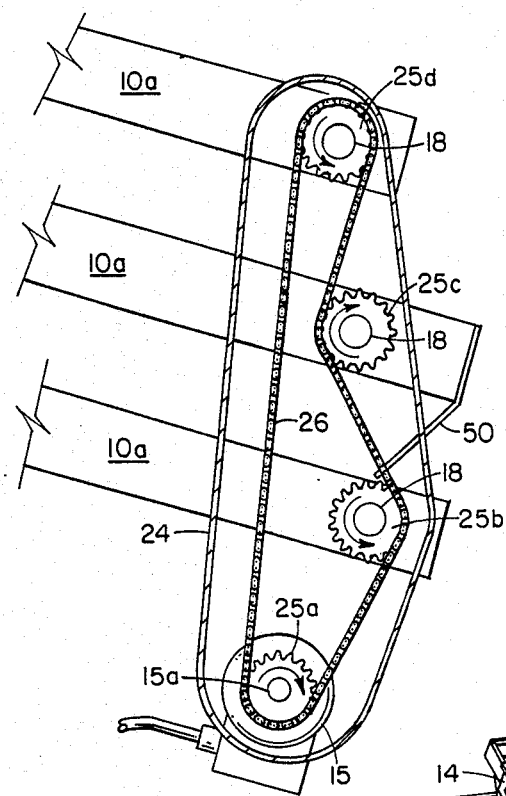
FIG. 4 is a sectional view taken on the plane 4—4 of FIG. 2.
Figure 5:
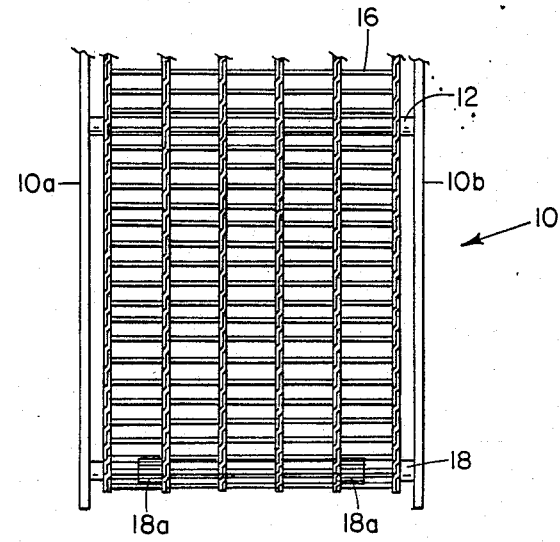
FIG. 5 is a partial elevational view showing the engagement of the endless belt wiremesh conveyor with the driving sprockets.

Referring to the drawings, a three flight conveyor unit 1 for air cooling hot baked articles, such as tortillas, is disclosed having substantially identical individual flights 10, 20 and 30 arranged in vertically stacked, generally parallel relationship with respect to a floor engaging support frame 40. Each of the conveyor flights 10, 20 and 30 are substantially identical except for the length of the particular flight. Similar numerals on flights 20 and 30 indicate components to be described in connection with a conveyor flight 10. Each conveyor flight above conveyor flight 10 is slightly shorter in length to facilitate transfer of the baked articles from an upper flight to a lower flight.

The longest and lowest single flight conveyor 10 comprises a ladder shaped frame structure formed of a pair of longitudinally extending, semi I-beams or side rails 10a which are held in spaced relationship by a plurality of longitudinally spaced support rods 12. Each support rod 12 comprises a plastic rod or tube formed from one of a class of plastic materials having wear resistant, lubricious properties and approved by the U.S.F.D.A. for use in the food processing industry. Examples of such materials are the materials sold under the trademarks "DELRIN" and "TEFLON" by DU-PONT Company.

The outer ends of each support rod 12 are internally bored and threaded to receive mounting bolts 12a. The extreme left hand end of the lowermost conveyor flight 10 is provided with a longitudinally adjustable mounting 14 for another plastic support rod 12 having grooves (not shown) for positive centering of the conveyor belt 16. The purpose of the adjustable mounting is to conveniently permit the tension of an encircling stainless steel, wiremesh, endless belt 16, surrounding the support rods 12 to be conveniently adjusted. Similar adjustable mountings 14 are provided on each of the conveyors.

On the right hand end of each conveyor, a driving rod 18 formed of stainless steel is mounted in a pair of sealed bearings 17 respectively secured to the end portions of the side rails 10a. Each drive rod 18 has two or more sprockets 18a formed of stainless steel rigidly secured thereto so as to engage and drive the stainless steel wiremesh endless belt 16.

A motor support bracket 10c is secured to the right hand end of the lowermost conveyor 10 and mounts a sealed motor and gear box unit 15. As can best be seen in FIG. 4, the output shaft 15a of the motor driven gear box 15 has a driving sprocket 25a secured thereto and this sprocket drives a chain encircling a plurality of sprockets 25b, 25c and 25d respectively mounted on the outwardly projecting end of the drive shafts 18.

The chain 26 and sprockets 25a, 25b, 25c and 25d are enclosed within the interior of an upwardly extending casing 24. Chain 26 engages the opposite sides of the successive conveyor sprockets. In this manner each conveyor is driven in an opposite direction to the vertically adjacent conveyor unit. If additional flights are required, they would be driven in a similar manner.

From the foregoing description, it will be apparent that the wiremesh conveyors 16 of each of the three successive conveyor units 10, 20 and 30 move in opposite directions and, as will be later explained, this permits for the convenient transfer of a baked article to be transported by the conveyor unit from one flight to the next lower flight.

A guide plate 50 is provided at the discharge ends of the uppermost conveyor flight 30 and the intermediate conveyor flight 20. Such guide plates may be welded or otherwise secured to the side rails of the particular conveyor flight and are shaped so as to receive the baked article being transported by the wiremesh as it is discharged from an upper conveyor and falls toward the next lower conveyor flight to engage such article and invert it so that the cooling of the article is expedited by having successive sides of the baked article successively contacted by the wiremesh belt 16.

Figure 3:
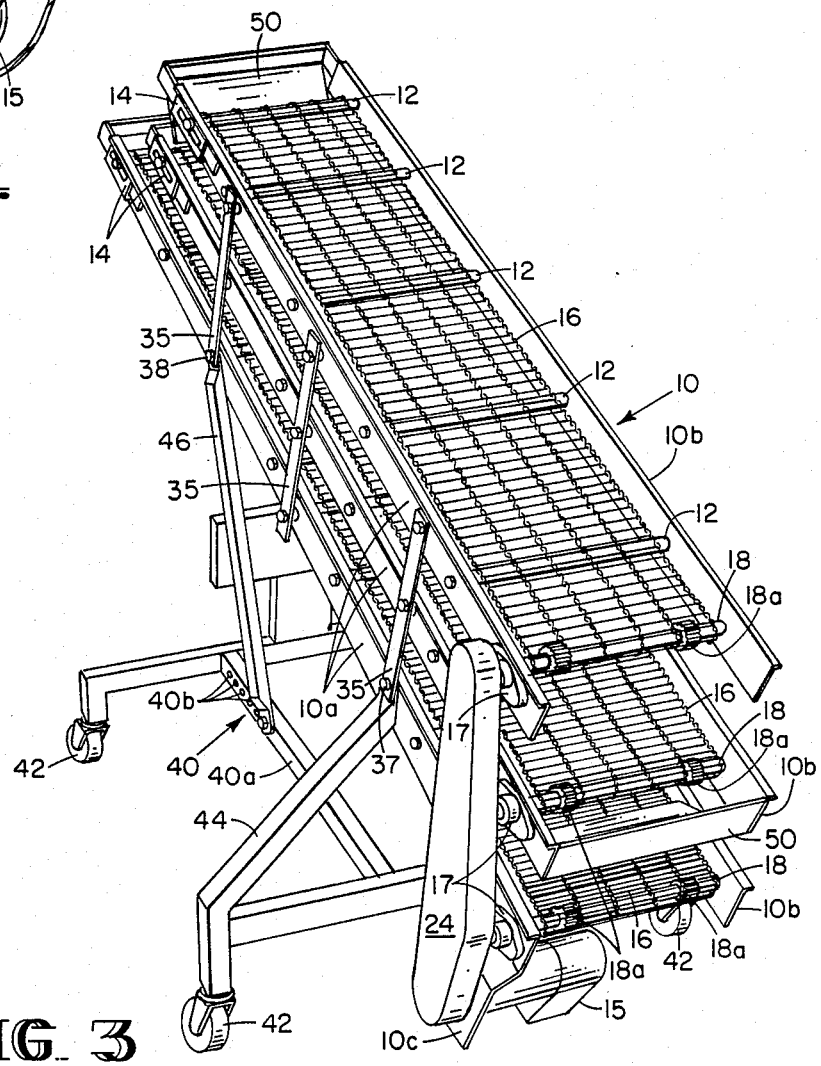
FIG. 3 is a perspective view of the conveyor shown in FIGS. 1 and 2.

As will be readily apparent from FIGS. 1 and 3, the three conveyor flights 10, 20 and 30 are detachably rigidly secured in vertical stacked relationship by a plurality of straps 35 which are rigidly secured to the side channels 10a of the respective conveyor flights by bolts 36.

It is often desirable to vary the angular position of the vertically stacked conveyor flights relative to the horizontal. This can be conveniently accomplished by the support frame 40 upon which the three stacked conveyor units are mounted. Such floor engaging frame comprises a horizontal frame structure having four depending wheels 42 for engaging the floor of the plant wherein the conveyor unit 10 is to be mounted. The lower forward end of the stacked conveyor units is pivotally secured to a pair of upstanding posts 44 by bolts 37 at a position near the lower end of the stacked conveyor units. The two laterally spaced horizontal frame units 40a of the floor engaging support 40 is provided with a plurality of longitudinally spaced holes 40b. A second pair of support posts 46 are pivotally secured at their upper ends to the side rails 10a of the lowermost conveyor unit 10 by bolts 38 and at their lower ends are secured by bolt 39 in a selected one of the longitudinally spaced holes 40b. Thus, the vertical height of the uppermost end of the stacked conveyor unit 1 may be readily adjusted by shifting the bolt 39 to another one of the holes 40b.

Lastly, the rear end of the floor engaging frame is provided with an upstanding frame element 48 on which is mounted a conventional control unit 60 for controlling the starting, stopping and speed of the driving motor 15 to which it is connected by wires 52.

Referring specifically to FIG. 1, it will be noted that the uppermost conveyor unit 30 is of shorter length than the next underlying conveyor unit 20 which in turn is of shorter length than the bottommost conveyor unit 10. This permits the baked articles to be received on the lower end of the uppermost conveyor unit 30 and discharged from the upper end thereof, deposited on the upper end of the conveyor unit 20 to move downwardly to its lower end where the baked articles are discharged onto the upwardly moving conveyor element of the lowermost conveyor unit 10. The baked articles are discharged from the upper conveyor unit 10 into either a collection receptacle or are transferred to a conveyor leading to a packaging area of the plant. In any event, the baked articles are successively inverted as they are transferred from the uppermost conveyor to the intermediate conveyor and again from the intermediate conveyor to the lowermost conveyor. Thus, they end up in their original position.

While not limited thereto, the aforedescribed conveyor unit was designed for effecting the cooling of fresh baked tortillas which comprise a disc of baked dough. Any other type of baked goods may be handled by the described conveyor so long as they have sufficient strength to withstand the gravity transfer from one conveyor unit to the other.

Those skilled in the art will recognize that the aforedescribed construction provides a conveyor unit with an absolute minimum of stainless steel parts and particularly, with each flight utilizing substantially the same elements, and varying only in the length of the side rails which can be purchased in a greater length and cut to the desired sizes. Moreover, the supporting of the stainless steel wiremesh conveyor solely by the drive sprockets 16a, and the plastic support rods 12 utilizes what are essentially frame members of the conveyor unit as means for lubricating the stainless steel wiremesh conveyor.

Although the invention has been described in terms of specified embodiments which are set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed and desired to be secured by Letters Patent is:

1. A conveyor for cooling hot baked food articles comprising:
(1) a first conveyor flight comprising:
   a pair of elongated, stainless steel side rails disposed in laterally spaced, horizontally extending parallel relationship, each rail having a plurality of longitudinally spaced holes therein respectively aligned with the holes in the other rail;
   a plurality of lubricious plastic support rods having their end portions respectively mounted in each aligned pair of said holes;
   a pair of sealed bearings respectively secured to one end of said side rails in laterally aligned relationship;
   a drive shaft journalled in said sealed bearings and having one end projecting therethrough; first sprocket means secured to said projecting end of said drive shaft for rotating said drive shaft;
   second stainless steel sprocket means secured to said drive shaft intermediate said side rails;
   a stainless steel wiremesh endless belt encircling said support rods and said drive shaft intermediate said side rails, thereby defining a conveyor having an input and a discharge end;
(2) a second conveyor flight substantially identical to said first conveyor flight except in length; means for mounting said second conveyor flight in substantially parallel, overlying relationship to said first conveyor flight, but having its discharge end overlying the input end portion of said first conveyor flight;
(3) motor driven means mounted on one end of said side rails of said first conveyor flight for rotating said drive shaft of said first conveyor flight; means interconnecting said first sprocket means of said first and second conveyor flights to drive said wiremesh endless belt of said second conveyor flight in reverse direction relative to said wire mesh endless belt of said first conveyor flight, whereby the baked food articles discharged from the discharge end of said second conveyor flight are received by the input end of said first conveyor flight and moved to the other end for discharge therefrom; and
(4) a floor engaging support for said first conveyor flight having a pair of laterally spaced, upstanding posts respectively secured to said side rails of one of said conveyor flights at a non-medial location; a pair of support links respectively bolted to said side rails of one of said conveyor flights and depending therefrom; and means for securing the bottom ends of said support links to a selected one of a plurality of longitudinally spaced positions on said floor engaging support relative to said support posts, thereby varying the angular position of both said first and second conveyor flights relative to the horizontal.

2. The conveyor of claim 1 wherein said support frame has a plurality of transversely aligned pairs of longitudinally spaced, horizontal holes remote from said support posts, said support links being respectively secured to a selected pair of said holes.

3. A multi-flight conveyor pursuant to claim 1 further comprising deflection means mounted below the discharge end of said second conveyor flight engagable with the food articles discharged from said second conveyor flight to invert same for deposit on said input end of said first conveyor.

4. The multi-flight conveyor of claim 1 wherein said means for mounting said second conveyor flight in substantially parallel relationship to said first conveyor flight comprises a plurality of straps interconnecting the vertically adjacent side rails of said first and second conveyor flights.

5. The multi-flight conveyor of claim 1 further comprising a third conveyor flight substantially identical to said first conveyor flight except in length;
   means for mounting said third conveyor flight in substantially parallel, overlying relationship to said second conveyor flight, but with the discharge end of said third conveyor flight overlying the input end portion of said second conveyor flight;
   means interconnecting said drive shaft of said third conveyor flight to the drive shafts of said first and second conveyor flights to drive said wiremesh endless belt of said third conveyor flight in reverse direction relative to said wiremesh endless belt of said second conveyor flight, whereby the baked food articles discharged from the discharge end of said third conveyor flight are received by the input end of second conveyor flight and moved to the other end for discharge therefrom to the input end of said first conveyor flight and moved to the other end of said first conveyor flight for discharge therefrom.

6. A multi-flight conveyor pursuant to claim 5 further comprising deflection means mounted below the discharge ends of said third and second conveyor flights engagable with the food articles respectively discharged from said third and second conveyor flights to invert same for deposit on said input end of the respective underlying conveyor flight.

7. The multi-flight conveyor of claim 5 wherein said means for mounting said third conveyor flight in substantially parallel relationship to said first and second conveyor flights comprises a plurality of straps interconnecting the vertically adjacent side rails of said first, second and third conveyor flights.

* * * * *